United States Patent
Carlson et al.

(10) Patent No.: US 9,015,362 B2
(45) Date of Patent: *Apr. 21, 2015

(54) MONITORING NETWORK PERFORMANCE AND DETECTING NETWORK FAULTS USING ROUND TRIP TRANSMISSION TIMES

(75) Inventors: Scott M. Carlson, Tucson, AZ (US); Marisa Freidhof, Austin, TX (US); Geoffrey E. Miller, Highland, NY (US); Dale F. Riedy, Poughkeepsie, NY (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 657 days.

This patent is subject to a terminal disclaimer.

(21) Appl. No.: 12/838,029

(22) Filed: Jul. 16, 2010

(65) Prior Publication Data

US 2012/0017121 A1 Jan. 19, 2012

(51) Int. Cl.
| | |
|---|---|
| *G06F 3/00* | (2006.01) |
| *G06F 11/00* | (2006.01) |
| *H04L 1/14* | (2006.01) |
| *H04L 12/24* | (2006.01) |
| *H04L 12/26* | (2006.01) |
| *H04L 12/801* | (2013.01) |

(52) U.S. Cl.
CPC ............ *H04L 41/0654* (2013.01); *H04L 47/29* (2013.01); *H04L 47/12* (2013.01); *H04L 43/0864* (2013.01); *H04L 43/16* (2013.01)

(58) Field of Classification Search
CPC . H04L 41/0654; H04L 43/0864; H04L 43/16; H04L 47/12; H04L 47/29

USPC .............................. 710/18; 370/248; 714/750
See application file for complete search history.

(56) References Cited

U.S. PATENT DOCUMENTS

| | | | |
|---|---|---|---|
| 6,212,171 B1 * | 4/2001 | LaFollette et al. ............ 370/257 |
| 6,598,069 B1 | 7/2003 | Rooney et al. |
| 6,636,981 B1 | 10/2003 | Barnett et al. |
| 6,728,772 B1 | 4/2004 | Driever et al. |

(Continued)

OTHER PUBLICATIONS

Per Session RTT Management; Authors et. al.: IBM; Publication Date: Oct. 7, 2005. [online] IP.com Prior Art Database Technical Disclosure; I P.com No. I PCOM000129921 D.*

(Continued)

*Primary Examiner* — Eric Oberly
(74) *Attorney, Agent, or Firm* — Cantor Colburn LLP; William A. Kinnaman, Jr.

(57) ABSTRACT

A computer program product is provided for performing a method including: receiving transmission data over a selected time interval for each of a plurality of communication paths; calculating an average round-trip transmission time for each of the plurality of communication paths over the time interval; comparing an average round-trip transmission time for a communication path having the highest average round-trip transmission time to a threshold value and to a multiple of an average round-trip transmission time for a communication path having the lowest average round-trip transmission time; and determining, based on a result of comparing the highest round-trip transmission time to the threshold value and to a multiple of the lowest round-trip transmission time, whether the time period indicates a delay in communication between the I/O subsystem and the control unit requiring at least one of a monitoring action and a recovery action.

13 Claims, 15 Drawing Sheets

(56) References Cited

U.S. PATENT DOCUMENTS

| | | | |
|---|---|---|---|
| 6,766,466 B1 | 7/2004 | Jibbe | |
| 6,973,595 B2 | 12/2005 | Kaminsky et al. | |
| 7,149,821 B2 | 12/2006 | Brice, Jr. et al. | |
| 7,174,274 B2* | 2/2007 | Carlson et al. | 702/186 |
| 7,441,045 B2* | 10/2008 | Skene et al. | 709/241 |
| 7,587,528 B2 | 9/2009 | Hathorn et al. | |
| 7,945,816 B1* | 5/2011 | Gardner | 714/43 |
| 2002/0199016 A1* | 12/2002 | Freedman | 709/241 |
| 2003/0088529 A1* | 5/2003 | Klinker et al. | 706/3 |
| 2005/0076113 A1* | 4/2005 | Klotz et al. | 709/224 |
| 2006/0029037 A1* | 2/2006 | Chen et al. | 370/351 |
| 2006/0262772 A1* | 11/2006 | Guichard et al. | 370/351 |
| 2007/0115846 A1* | 5/2007 | Kooyers et al. | 370/252 |
| 2008/0046558 A1* | 2/2008 | Raja et al. | 709/224 |
| 2008/0263238 A1* | 10/2008 | Brice et al. | 710/38 |
| 2009/0210573 A1 | 8/2009 | Yudenfriend et al. | |
| 2009/0210582 A1 | 8/2009 | Bendyk et al. | |
| 2009/0210884 A1 | 8/2009 | Ricci et al. | |
| 2010/0070663 A1 | 3/2010 | Coronado et al. | |
| 2010/0083061 A1 | 4/2010 | Coronado et al. | |
| 2010/0086077 A1 | 4/2010 | Hathorn et al. | |
| 2011/0149730 A1* | 6/2011 | Nemeth et al. | 370/234 |

OTHER PUBLICATIONS

C. Beuselinck,"System z10 EC Extended Distance Solutions," IBM Corporations, Aug. 12, 2008.

D. Breitgrand et al. "Root-Cause Analysis of SAN Performance Problems: An I/O Path Affine Search Approach," IEEE, May 15-19, 2005.

B. Dufrasne et al. "IBM System Storage DS6000 Series: Architecture and Implementation," ibm.com/redbooks, Third Edition, Nov. 2006.

S. Guendert, "Improving Performance for FICON Infrastructures," Mainframe Global Solutions Architect Brocade, Feb. 25, 2008.

A. De Jong et al. "A Disk Subsystem View on FICON Performance," IBM System Storage and Storage Network Symposium, Aug. 20-24, 2007.

H. Yudenfriend, "z/OS SAN Fault Isolation and First Failure Data Capture," IBM Corporation, Feb. 14, 2009.

* cited by examiner

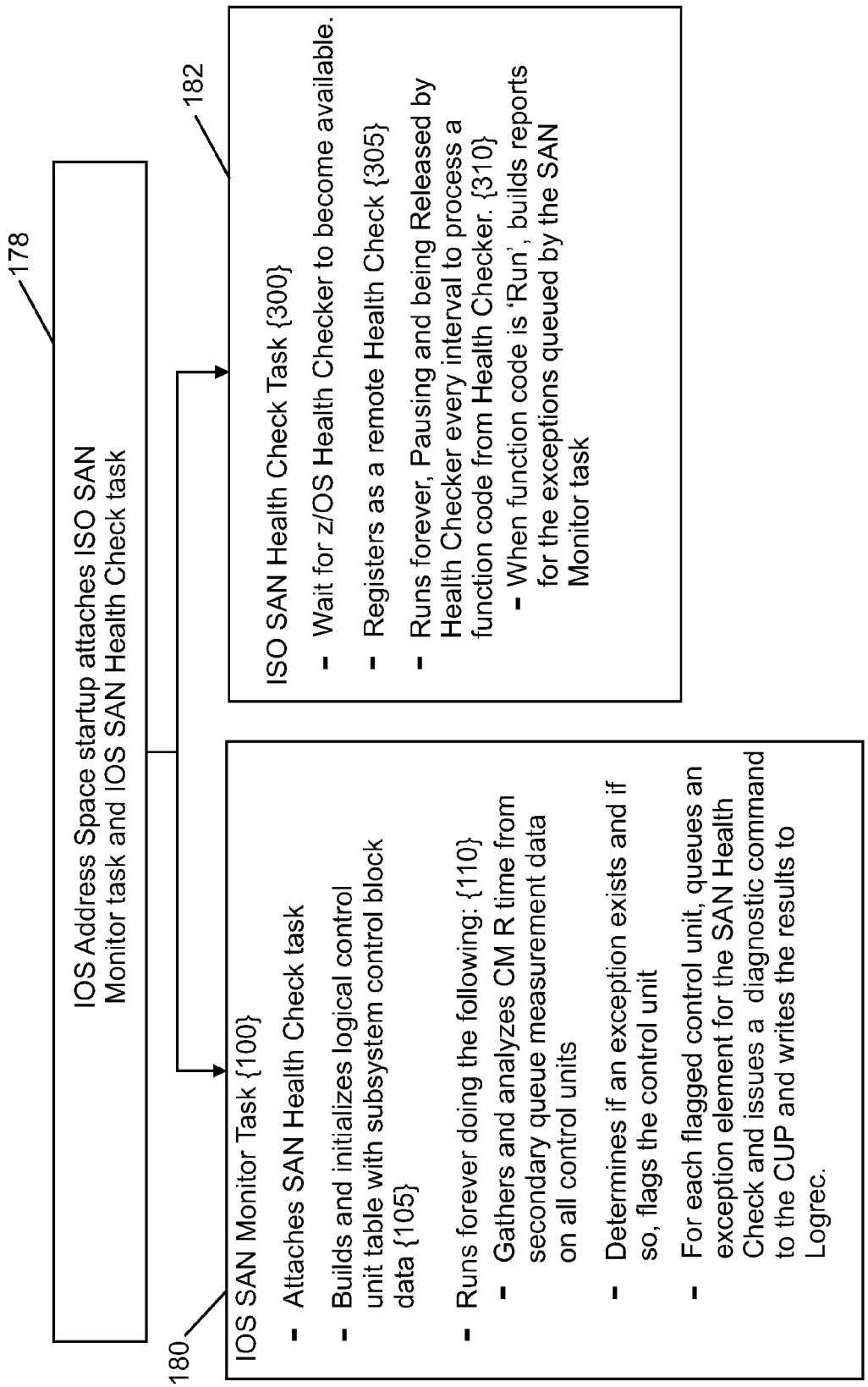

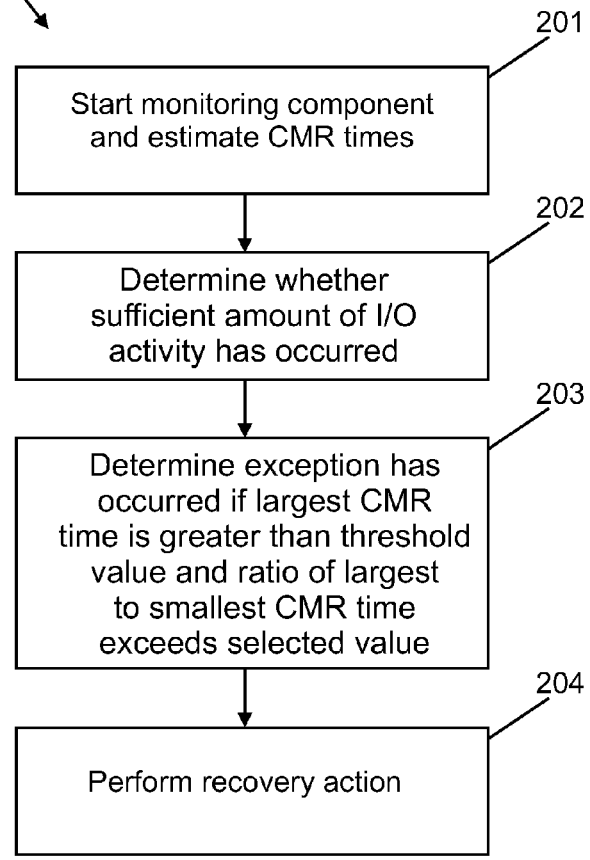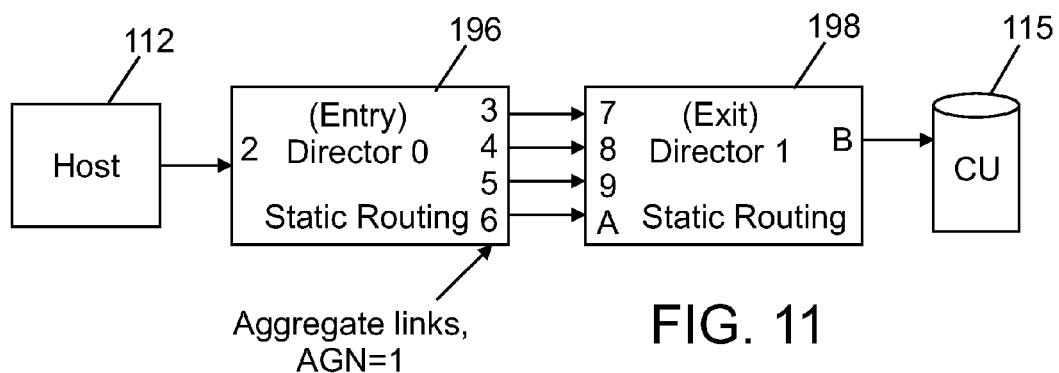

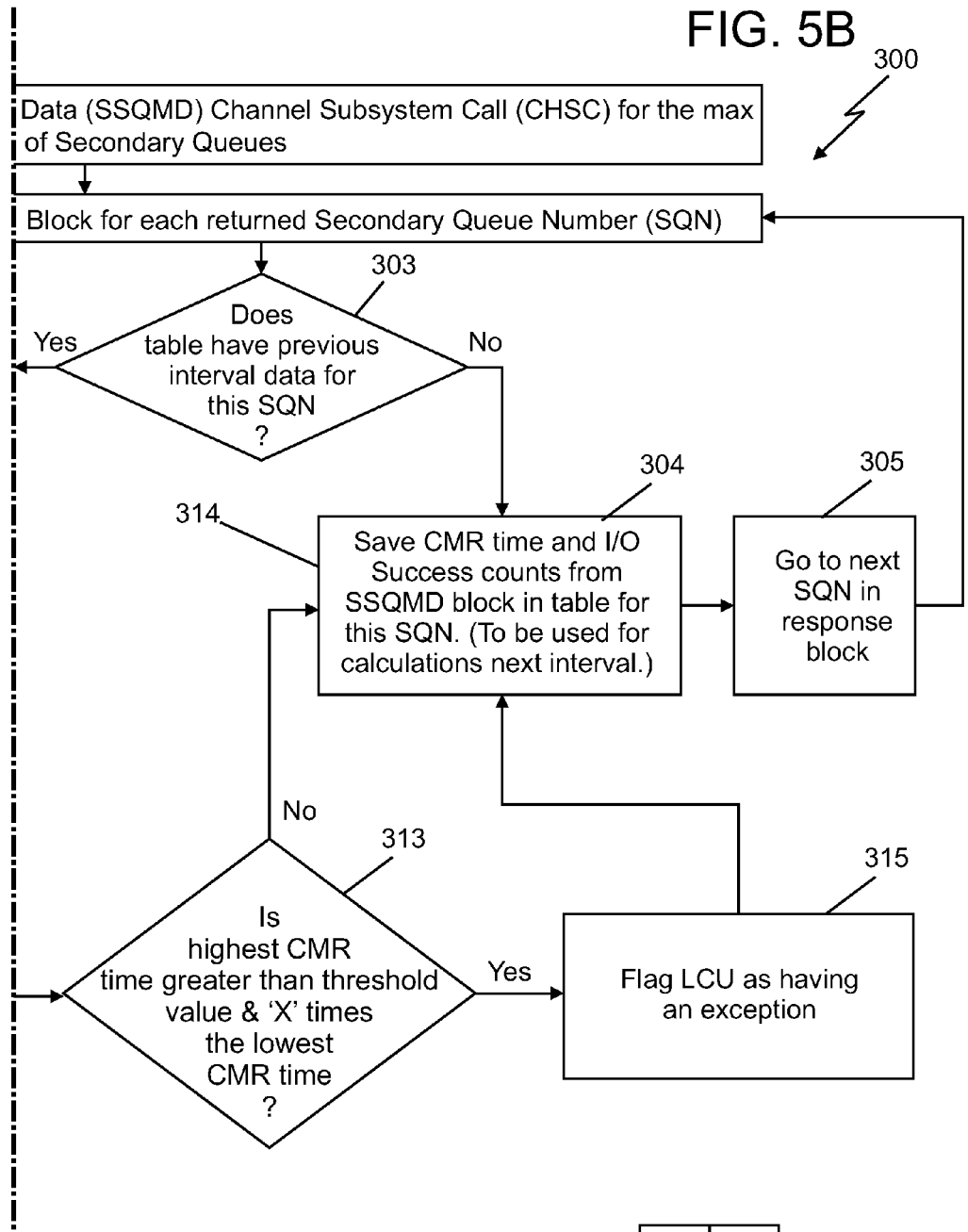

| FIG. 8A | FIG. 8B |

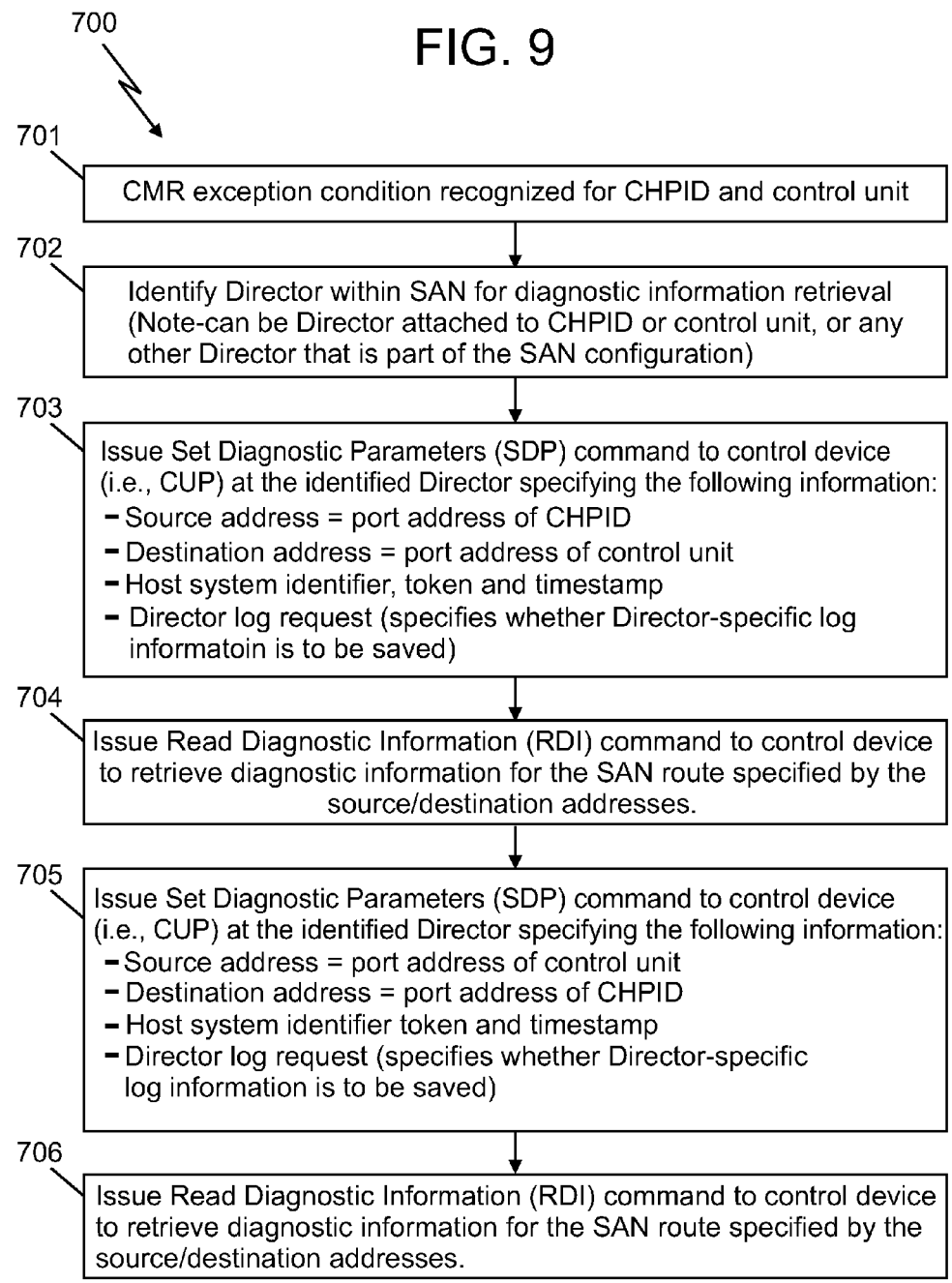

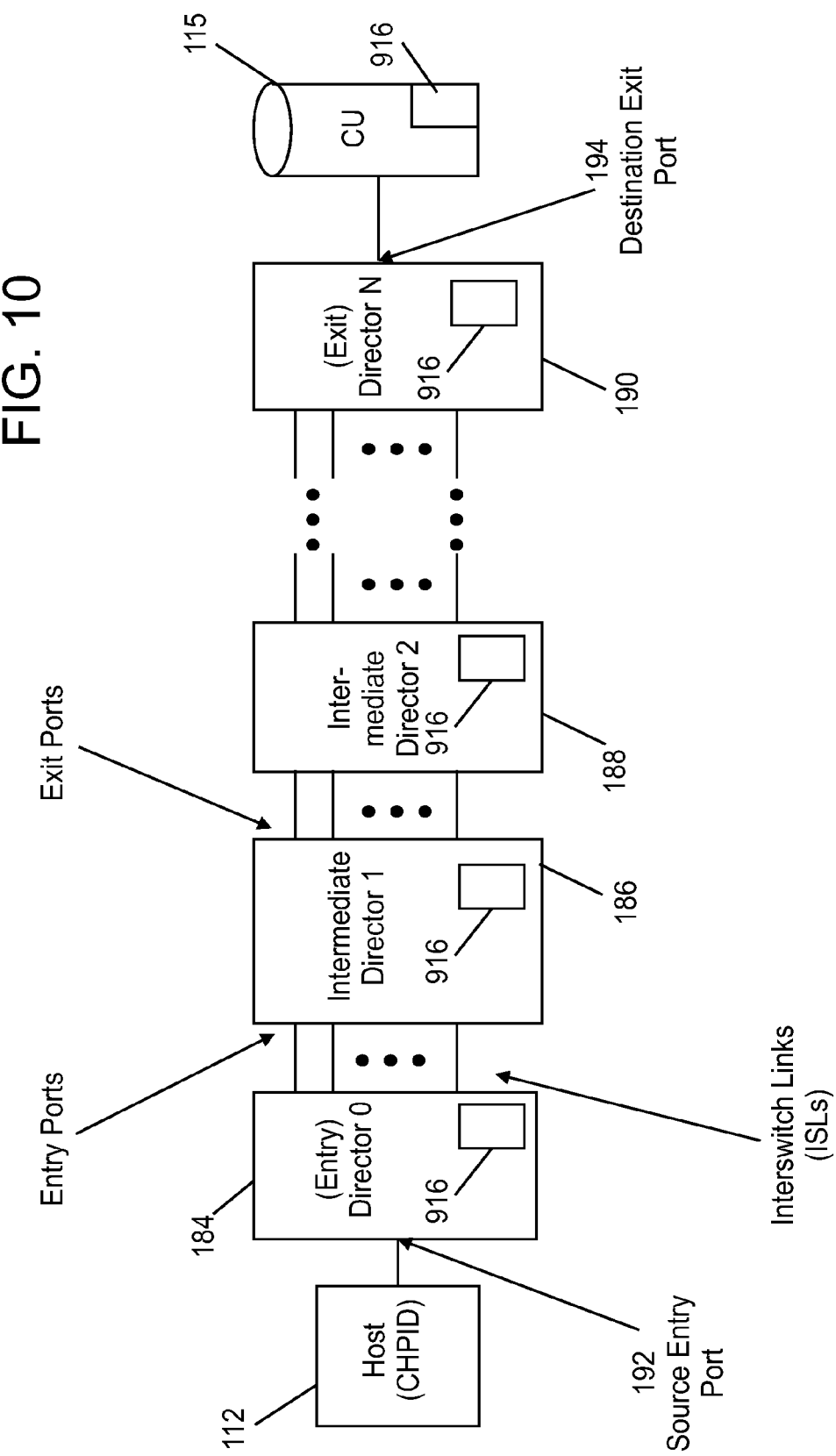

FIG. 12A

Entry Director 0 DDB

Entry Ports

| Entry Port Address | Attached Port Address/CH or CU | Link Type (S/A) | Routing (S/D) | Exit Port Adrs or Group # | Statistics | | |
|---|---|---|---|---|---|---|---|
| | | | | | Util. % | Delay % | Error Cnt |
| 2 | CH | S | S | AGN1 | | | |

Exit Ports

| Exit Port Address | Attached Port Address/CH or CU | Link Type (S/A) | AGN | DGN | Statistics | | |
|---|---|---|---|---|---|---|---|
| | | | | | Util. % | Delay % | Error Cnt |
| 3 | 7 | A | 1 | DGN | | | |
| 4 | 8 | A | 1 | – | | | |
| 5 | 9 | A | 1 | – | | | |
| 6 | A | A | 1 | – | | | |

FIG. 12B

Exit Director 1 DDB

Entry Ports

| Entry Port Address | Attached Port Address/CH or CU | Link Type (S/A) | Routing (S/D) | Exit Port Adrs or Group # | Statistics | | |
|---|---|---|---|---|---|---|---|
| | | | | | Util. % | Delay % | Error Cnt |
| 7 | 3 | A | S | B | | | |
| 8 | 4 | A | S | B | | | |
| 9 | 5 | A | S | B | | | |
| A | 6 | A | S | B | | | |

Exit Ports

| Exit Port Address | Attached Port Address/CH or CU | Link Type (S/A) | AGN | DGN | Statistics | | |
|---|---|---|---|---|---|---|---|
| | | | | | Util. % | Delay % | Error Cnt |
| B | CU | S | — | — | | | |

MONITORING NETWORK PERFORMANCE AND DETECTING NETWORK FAULTS USING ROUND TRIP TRANSMISSION TIMES

BACKGROUND

The present invention relates to computer Input/Output (I/O) systems and devices and, more specifically, to real time monitoring of system performance to identify SAN and I/O device conditions causing performance degradations.

Storage Area Networks (SANs) can consist of a number of physically separate fiber channel switches with hundreds and possibly thousands of ports connected together to form a single logical fabric. Although a single logical fabric can consist of many physical switches with redundant inter switch links (ISLs), the switch fabric as a whole is a single point of failure because the intelligence that manages the fabric, e.g. the name server, can fail. Clients that require continuous availability for accessing devices from computer systems over the SAN will typically configure redundant paths from the host to the storage devices through a fabric and also deploy redundant fabrics. There are many causes for poor performance in a fabric without an explicit error being detected. For example, firmware errors managing ISL traffic can have bugs, and high traffic can cause congestion which in turn can cause secondary effects where I/O traffic is delayed. The target storage subsystems can also have errors causing I/O delays on specific channel paths. The host processor and operating system may also have errors in their path selection algorithms leading to congestion and resulting in unnecessary high average I/O service times.

SUMMARY

An embodiment includes a computer program product for processing communications between a host processor and at least one device connected to the host processor by an input/output (I/O) processing system. The computer program product includes a tangible storage medium readable by a processing circuit and storing instructions for execution by the processing circuit for performing a method including: receiving transmission data over a selected time interval for each of a plurality of communication paths between the host processor and a control unit configured to control at least one I/O device; calculating an average round-trip transmission time for each of the plurality of communication paths over the time interval; comparing an average round-trip transmission time for a communication path having the highest average round-trip transmission time to a threshold value and to a multiple of an average round-trip transmission time for a communication path having the lowest average round-trip transmission time; and determining, based on a result of comparing the highest round-trip transmission time to the threshold value and to a multiple of the lowest round-trip transmission time, whether the time period indicates a delay in communication between the I/O subsystem and the control unit requiring at least one of a monitoring action and a recovery action.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 depicts a program executing in an address space in an operating system of the computer system of FIGS. 1A and 1B;

FIG. 4 is a flow diagram depicting an exemplary embodiment of a method of monitoring devices connected to one or more host processors and identifying delays therein;

FIGS. 5A and 5B is a flow diagram depicting an exemplary embodiment of a method of monitoring devices connected to one or more host processors and identifying delays therein;

FIG. 9 is a flow diagram depicting an exemplary embodiment of a method of retrieving diagnostic information from devices connected to one or more host processors;

FIG. 10 depicts an exemplary embodiment of a computer system including a host processor having an input/output processing system and a plurality of devices connected to the host processor;

FIG. 11 depicts an exemplary embodiment of a computer system including a host processor having an input/output processing system and a plurality of network devices connected to the host processor; and FIGS. 12A and 12B depict an example of a diagnostic block generated by the method of FIG. 10.

DETAILED DESCRIPTION

The systems and methods described herein include means for detecting I/O delays caused by an I/O fabric, I/O device or a network device, identifying an I/O device or a network device causing the delay, and/or gathering diagnostic data in real time that will allow for quick resolution of delay issues without the need to recreate the delay problem. A system and method utilizes round-trip transmission time data such as command response times to determine whether there is degradation in performance that should be addressed. A round-trip transmission time is the time elapsed between sending a message by a host to a logical control unit or other entity and the receipt of an acknowledgement or other response to the message by the logical control unit. The round-trip transmission time or a value derived from a plurality of round-trip transmission times may be used to identify degradations or delays in channel paths or other communication paths. In one embodiment, the host receives round-trip transmission times such as initial command response (CMR) times over a plurality of communication paths between the host and one or more entities (e.g., storage subsystems). In one embodiment, the CMR time is an average CMR time per I/O operation calculated for each communication path (e.g., channel path) to a control unit over a selected time interval. If the maximum CMR time across all communication paths exceeds a specific threshold, then a ratio of the maximum CMR time for one of the paths to the smallest CMR time for the remaining paths is calculated. If that ratio exceeds a selected value (e.g., a customer specified value), an error or exception is recognized and the host may perform appropriate recovery actions or monitoring actions such as a health check function, diagnostic commands and recovery actions. Examples of such actions include producing an error report identifying the I/O resources subject to the CMR time imbalance or exception and the CMR time values found. Additionally, the host may issue diagnostic commands to provide data that can help identify the root cause of the problem. The diagnostic commands may be issued to a SAN fabric and the storage subsystem affected. Finally, the host, based on a user or customer specified policy, may take selected I/O resources, such as the channel paths 126 with the high CMR delay, offline to prevent further delays.

Figure 1A:
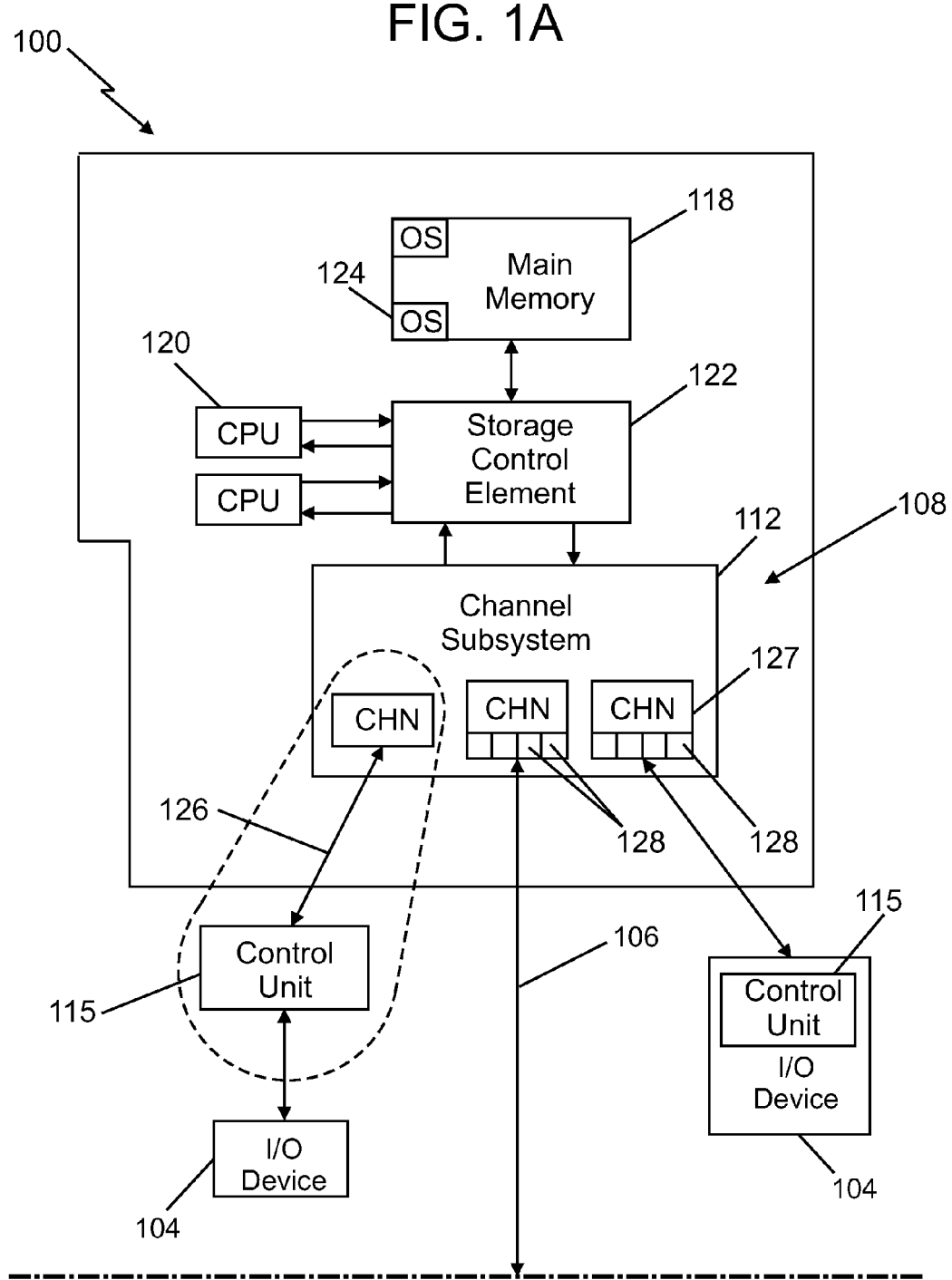
FIGS. 1A and 1B depict an exemplary embodiment of a computer system including a host processor having an input/output processing system and one or more devices connected to the host processor.
Figure 1B:
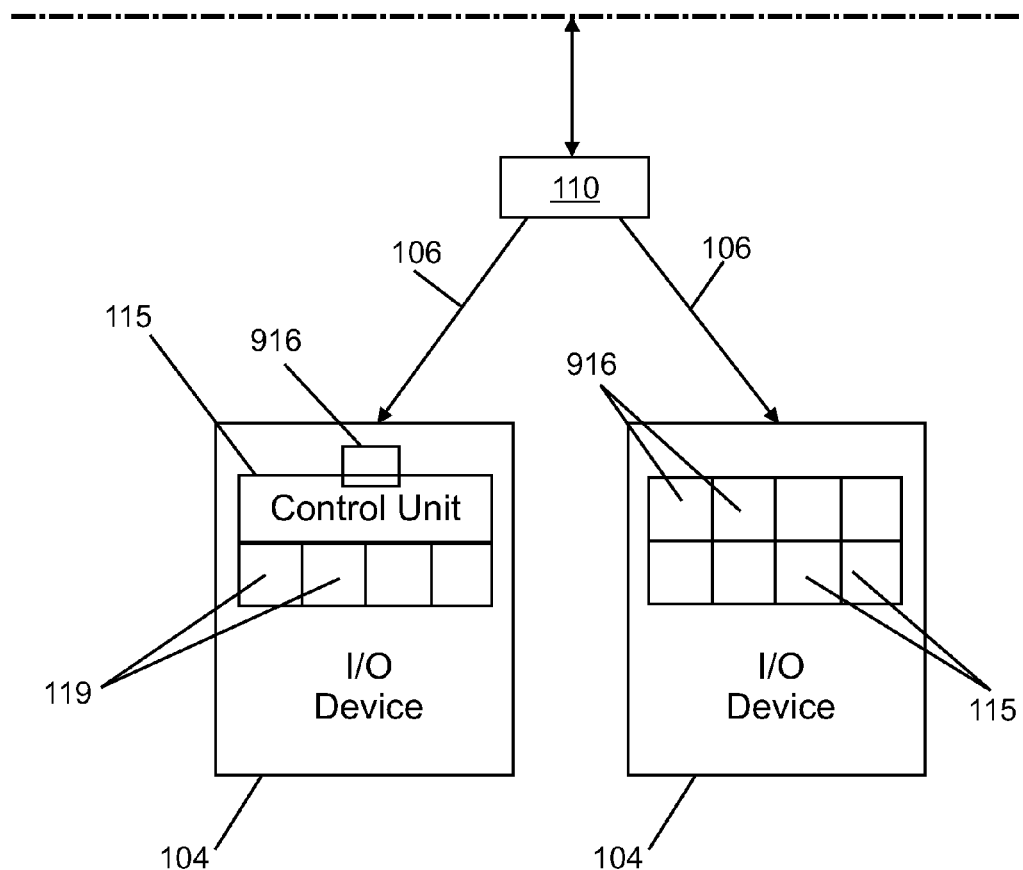
Figure 1:
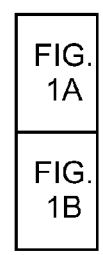

FIGS. 1A and 1B illustrate an exemplary embodiment of a computing, processing and/or data management system 100 including one or more host processors 102 such as one or more computers, servers, mainframes, storage area networks or fabrics. The one or more host processors 102 connected to one or more I/O devices 104. The host processor 102 may be any computer or processing and/or storage device, such as a server, storage unit, data center and device management unit. The host processor 102 may be a large scale computing system, such as a mainframe or server. The I/O devices 104 may be connected in communication with the host processors 102 via suitable connectors 106 such as wires, cables and optical fibers, as part of, for example, a Fibre Channel (FC) or Internet Protocol (IP) network.

Each host processor 102 includes an I/O processing system 108 configured to facilitate communication between the host processors 102 and the I/O devices 104. In one embodiment, the host processor 102 is connected to each device entity via a direct, point-to-point connection. In one embodiment, the system 100 includes one or more network processors such as name servers, network switches and/or Fibre Channel switches 110 that connect paths between the host processor 102 and the device entities 104 in a network or fabric. Each switch 110 is coupled to an I/O processing system 108 and one or more device entities 104 and provides the capability of physically interconnecting any two links that are attached to the switch 110. The network processor may include a database or other structure storing network configuration information for each physical endpoint of the network, such as identifiers, fabric addresses and zoning procedures.

In one embodiment, the host processor(s) 102 are configured as a system complex or "sysplex" that includes multiple processors such as servers or mainframes connected as a single logical system. In one example, the host processor 102 is a parallel or other sysplex that act as a single system image with an operating system. The sysplex may include dedicated hardware and/or virtual images executing under the control of a hypervisor or a PR/SM (Processor Resource/System Manager). For example, one or more of the host processors 102 include operating systems (OSs) 124 that may be partitioned into one or more images or logical partitions (LPARs), and multiple physical and/or logical (e.g., LPARs) host computers may be connected in the cluster or sysplex.

In one embodiment, the I/O processing system 108 includes a channel subsystem 112, and each I/O device 104 includes or is connected to one or more physical and/or logical control units 115 which may be associated with one or more logical devices or device images 119. Examples of I/O devices 104 include disk controllers, tape controllers, card readers and punches, magnetic tape units, direct access storage devices, displays, keyboards, printers, pointing devices, teleprocessing devices, communication controllers and sensor based equipment, to name a few. Each logical or physical control unit 115 may be associated with a control unit port (CUP) 916. The CUPs 916 may reside in fabric switches 110 (e.g., for network or fabric configurations) or may reside in respective destination ports, control units 115 or devices (e.g., for point-to-point configurations. The logical control units 115 and logical devices 119 may be any non-physical device incorporated in or associated with the device 104, destination port or node, including any storage or memory area, logical volume, or image.

The host processor 102 includes, for example, a main memory 118, one or more processors such as central processing units (CPUs) 120, a storage control element 122, and the channel subsystem 112. Main memory 118 stores data and programs, which can be input from I/O devices 104. For example, the main memory 118 may include one or more operating systems (OSs) 124 (which may be configured as one or more logical partitions (LPAR)) that are executed by one or more of the CPUs 120. For example, one CPU 120 can execute a Linux™ operating system 124 and a z/OS™ operating system 124 as different virtual machine instances. The main memory 118 is directly addressable and provides for high-speed processing of data by the CPUs 120 and the channel subsystem 112.

One or more of the above components of the system 100 are further described in "IBM® z/Architecture Principles of Operation," Publication No. SA22-7832-05, 6th Edition, April 2007, which is hereby incorporated herein by reference in its entirety. IBM is a registered trademark of International Business Machines Corporation, Armonk, N.Y., USA. Other names used herein may be registered trademarks, trademarks or product names of International Business Machines Corporation or other companies.

The channel subsystem 112 provides a communication interface between host system 102, switches 110 and endpoints such as physical and/or logical control units 115 and/or CUPs 916. The channel subsystem 112 directs the flow of information between I/O devices 104 and main memory 118. It relieves the CPUs 120 of the task of communicating directly with the I/O devices 114 and permits data processing to proceed concurrently with I/O processing.

The channel subsystem 112 uses one or more communication paths, such as channel paths 126 (or I/O channels) as the communication links in managing the flow of information to or from the control units 115. The channel paths 126 (i.e., channels) may include any combination of communication devices (such as connectors 106 and/or switches 110) that form a logical path through which data is transferred between network components, such as between the channel subsystem 112 and an I/O device 104, logical control unit 115. Channels 126 may be connected by optical fiber, wireless and/or cable subsystem that connect components as well as switching devices. Subchannels 128 (hardware representations of each device 104 to the OS 124) may be associated with each control unit 115, and/or device 104 and serve to represent the device 104 to the OS 124. For example, a control unit 115 is associated with a set of up to 8 channels and may have up to 256 subchannels associated with a single control unit 115.

In one embodiment, one or more subchannels 128 are provided for each control unit 115, and accessible to a program through the channel subsystem 112. Each subchannel 128 represents a single device. The operating system may provide (via, for example, a data structure, such as a table or a control block such as a unit control block (UCB)) the logical appearance of a device to the host operating system. Each subchannel 128 provides information concerning the associated I/O device 104 and its attachment to the channel subsystem 112. The subchannel 128 also provides information concerning the state of I/O operations and other functions involving the associated I/O device 104. The subchannel 128 is the means by which the channel subsystem 112 provides information about associated I/O devices 104 to CPUs 120, which obtains this information by executing I/O instructions received from, for example, the O/S 124. Each subchannel 128 is associated with a logical control unit 115 that is associated with one or more paths or channels 126.

The channel subsystem 112 and devices connected thereto may be configured to communicate via any suitable protocol. Examples of protocols include Fibre Channel (FC) protocols defined in the standard by the INCITS Fibre Channel (T11) Technical Committee. Examples of FC protocols include FICON (Fibre Connectivity) protocols, as well as protocols supporting channel command words (CCW) channel programs and protocols supporting transport control word (TCW) channel programs, as described, for example, in U.S. Patent Publication No. US 2009/0210581 A1 entitled "Bi-directional Data Transfer Within a Single I/O Operation," which is hereby incorporated herein by reference in its entirety.

In one embodiment, a Channel Subsystem Call (CHSC) instruction is used by the OS 124 to request various I/O operations and supports various I/O commands (referred to herein as CHSC commands). In one embodiment, the CHSC instruction is an instruction with a single operand which addresses a "command request block" which contains an operation code field that is capable of representing a large number of operation codes, each of which designates a special command function for the CHSC instruction. Examples of CHSC commands include the "change channel path configuration command", the "change control unit configuration command", and the "change I/O device configuration command". Although the embodiments described herein describe CHSC commands, the OS 124 may use any instruction or communication to execute I/O operations, and the channel subsystem 112 may use any suitable commands or other messages.

The command request block includes request information in its operation code field (and in other fields) that adapt the CHSC command to unique functions to be performed in the channel subsystem 112. In operation, the OS 124 executes the CHSC instruction to send its command request block to the channel subsystem 112. The channel subsystem 112 attempts to execute the command indicated within the received command request block, and transmitting the response information back to the OS 124 executing that CHSC command.

The performance of the system 100 environment may be monitored, for example, by the OSs 124 to detect and correct inefficiencies in performance with a goal of identifying degradations in system performance. In order to monitor system performance, measurement data is collected and analyzed and may be collected in control blocks in the host processor 102, such as logical control unit blocks associated with logical control units 115. Measurement data is also collected to facilitate in accounting, as well as capacity planning. For example, protocols such as FICON include the ability to collect in-band I/O measurements that parse the components of service time. Part of service time includes a "start pending time". Start pending time is the time it takes for the I/O operation to actually begin executing after the OS 124 initiates an I/O operation. For example, the CSS 112 may include a timer to record the time of a "Start Subchannel" or "Resume Subchannel" executed by the channel subsystem 112 for a given subchannel 128 and channel path 126, and record a time of receipt of a command response (CMR) and calculates the total start pending time as the difference between the time of execution and the time of CMR receipt. Further, FICON and other protocols may allow for the parsing of the start pending time to get an initial command response time (CMR time) for each control unit 115. The CMR time is the time it takes for an initial command to travel through the fabric or connection from the channel subsystem 112, arrive at the I/O device 104 and for an acknowledgment of the command (i.e., a command response) to get back to the channel subsystem 112. This round trip represents the minimal time to traverse the fabric or connection without any actual command execution. This minimal time may be affected by a degradation some where in a communication path and/or fabric. The host CSS 112 may capture the CMR time for every path 126 to every device 114 that is to be monitored, to help users to plan for capacity planning and identify bottlenecks. The CMR time may also be reported for each logical control unit 115 by having the channel subsystem 112 aggregate all the CMR time for each path to a logical control unit block in the host processor 102, such as a secondary measurement queue block shown in FIG. 2. For example, measurement data relating to I/O operations is collected and stored in measurement blocks assigned to logical control units 115 for I/O devices.

For example, measurement data is also obtained that is associated with one or more secondary queues associated with one or more subchannels 128. A secondary queue represents a logical control unit and serves as a queue anchor for all of the I/O requests that cannot execute because of a control unit busy condition. The channel subsystem 112 stores data in a secondary queue measurement block as it encounters busy conditions for the various I/O components associated with the I/O requests. Data is also stored for every I/O operation to every device associated with the logical control unit.

Figure 2:
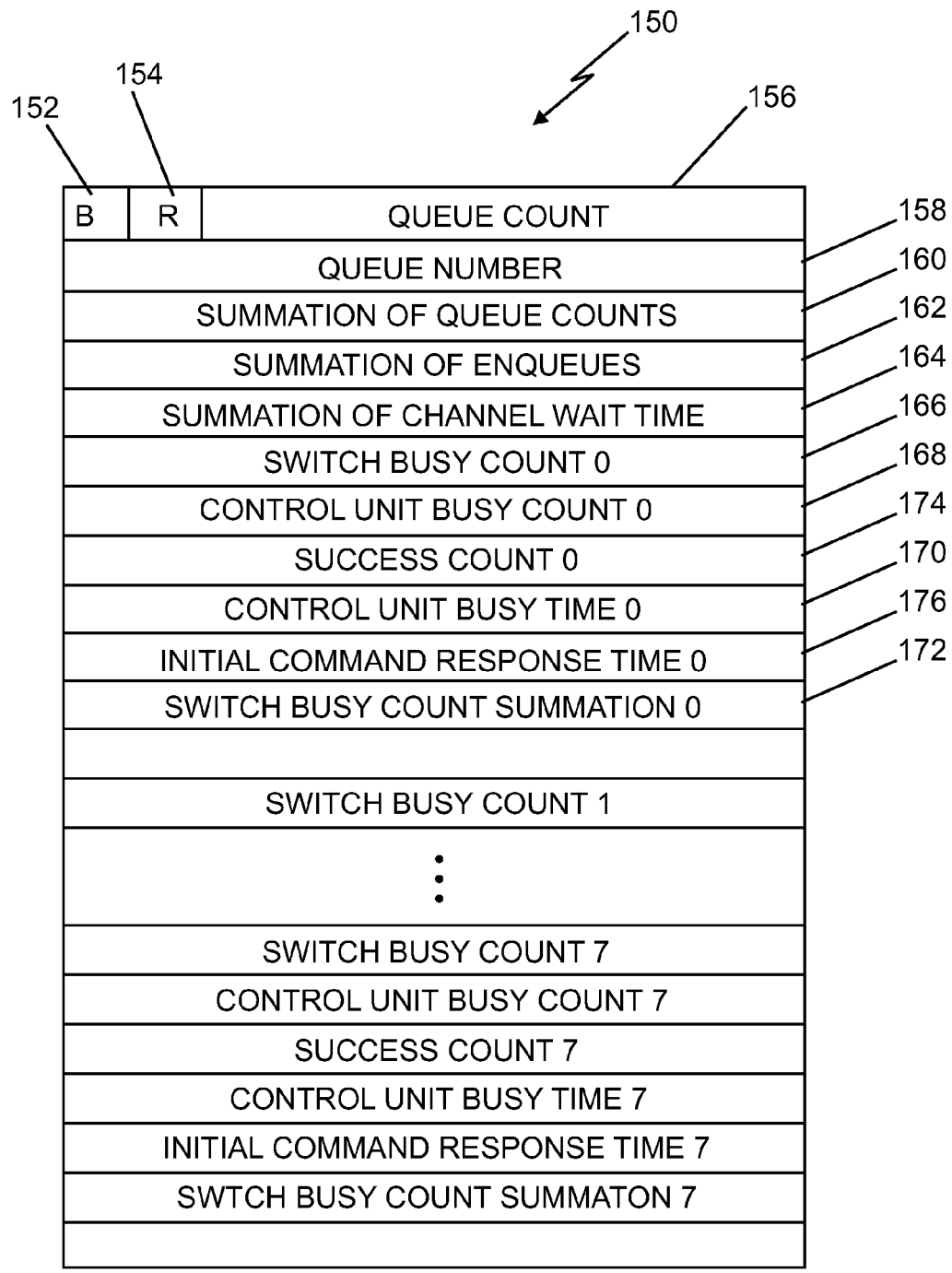
FIG. 2 depicts an exemplary embodiment of a secondary queue measurement block.

An example of a secondary queue measurement block 150 is described with reference to FIG. 2. The secondary queue measurement block may include various fields, such as a Queue Valid Indicator 152, a Queue Out Of Range 154, a Queue Count 156, a Queue Number 158, a Summation of Queue Counts 160, a Summation of Enqueues 162, a Summation of Channel Wait Time 164, Switch Busy Counts 166, Control Unit Busy Counts 168, Control Unit Busy Times 170 and Switch Busy Count Summations 172.

Additional exemplary fields include Success Counts fields 174. The success counts fields 174 include a count of the number of times an initial command or selection sequence for a start function resulted in the I/O device 104 accepting the first command of the channel program on the corresponding channel path 126. Each success count field may correspond with the subchannels 128 associated with the specified secondary queue.

Other exemplary fields are Initial Command Response Time fields 176. These fields may include the accumulated CMR times for start or resume functions successfully initiated on the channel path for the specified secondary queue. The initial command response time for a start or resume function is the time interval beginning from when the first command of the channel program is sent to the device until the device indicates it has accepted the command.

Further description of the measurement blocks 130 and the secondary queue measurement blocks 150 is included in U.S. Pat. No. 7,516,248 by Carlson et al., issued on Apr. 7, 2009, which is hereby incorporated herein by reference in its entirety.

In one embodiment, the OS(s) 124 includes one or more address spaces to isolate different programs and dedicated systems functions. Examples of address spaces include master, paging or I/O and configuration address spaces. In one embodiment, the OS 124 includes an IOS (I/O supervisor component) address space configured to hold tasks for monitoring and/or performing recovery actions for channels and/or devices connected to the host processor 102.

Referring to FIG. 3, in one embodiment, an IOS address space 178 is configured to be loaded with program instructions or tasks for monitoring and checking the health of devices and/or paths connected to the host processor 102. Exemplary tasks include an IOS Monitor Task 180 and an IOS Health Check Task 182. The Monitor and Health Check tasks may be configured to operate for network systems such as storage area networks (SAN) or point-to-point systems. The Monitor Task 180 may be configured to perform various functions, such as building and initializing a logical control unit block or table with subsystem control block data for each control unit 115. The Monitor Task 180 may also gather and analyze the CMR time from secondary measurement queue data for all control units 115, and determine whether an exception exists based on a comparison of a highest CMR time among the paths associated with a control unit with a threshold value and a comparison of the highest CMR time to a ratio of the highest CMR time to the lowest CMR time or a multiple of the lowest CMR time. As described herein, an "exception" is a condition in which a channel path 126 and/or a control unit 115 CMR time exceeds a selected ratio of a maximum to minimum CMR times, indicating that there is a degradation or delay in performance that should trigger a notification and/or a recovery action. If an exception exists, the Monitor Task 180 may flag the control unit 115 and queue an exception element in an exception data structure, such as a table. The Monitor task 180 may further issue a diagnostic command to the flagged fabric control unit port (CUP) 916 in FIG. 11 and writes the results of the diagnostic command to a logrec record. A diagnostic command can also be issued to the storage control unit 115.

The Health Check task 182 is configured to utilize a system checking component of the OS 124 to notify a user or remote device whether a control unit 115 or channel path 126 is functioning properly. An example of a system checking component is the IBM™ Health Checker for z/OS™, which is utilized to identify potential problems before they impact the system's availability. The Health Check Task 182 may be run continuously or periodically to check the exception queue and build reports for exceptions to be presented to the user or remote device.

FIG. 4 illustrates a method 200 of monitoring devices, processors and control units connected to one or more host processors. The method 200 includes one or more stages 201-206. Although the method 200 is described in conjunction with the host computer system or processor 102 and the channel subsystem 112, the method 200 can be utilized in conjunction with any processing and/or storage devices capable of I/O operations with remote devices, as well as with any network device or system. The method can be performed by one or more host processors, such as one or more host processors 102 or other processing or control entities in a cluster. In addition, the program instructions and configurations for monitoring I/O operations are not limited to the tasks described herein, but may be performed by any mechanism configured to measure times between sending responses over a communication path and receiving associated responses. In the first stage 201, the monitoring component in the OS 124 (or other host processor 102 component) is started up, and instructions such as a Monitor Task 180 and a Health Check Task 182 are attached to an address space 178. The monitoring component of the OS 124 processes measurement data relative to each control unit 115, such as CMR time. Each CMR time, or CMR time value derived from multiple CMRs, may, for example, be extracted from a secondary measurement queue 150 in the OS 124.

In the second stage 202, it is determined whether a sufficient amount of I/O activity has occurred for the storage subsystem. For example, the number of I/O operations successfully performed over the interval is determined am compared to a minimum number (e.g., 100 I/O operations in the monitoring interval).

In the third stage 203, If sufficient I/O activity has occurred for the storage subsystem, the maximum average CMR time across all channel paths in the monitoring interval is compared to a specific threshold (for example, one millisecond). If the maximum CMR time exceeds the threshold, then the ratio of the largest average CMR time for one of the paths to the smallest average CMR time for the remaining paths is calculated. If that ratio exceeds a selected value (e.g., a customer specified value), an error or exception is recognized and the monitoring component of the host OS 124 determines that an exception has occurred for the control unit 115.

In the fourth stage 204, the monitoring component may take a variety of recovery actions. Such recovery actions include cancelling or suspending I/O commands in the control unit over the path with the high CMR time, creating an exception log or record for analysis, creating an alert or otherwise notifying a user or remote device. Also, the operating system may issue the diagnostic commands to any components connected to the path such as the control unit 115 and/or fabric switches (see, e.g., CUPs 916 in FIG. 10).

Figure 6:
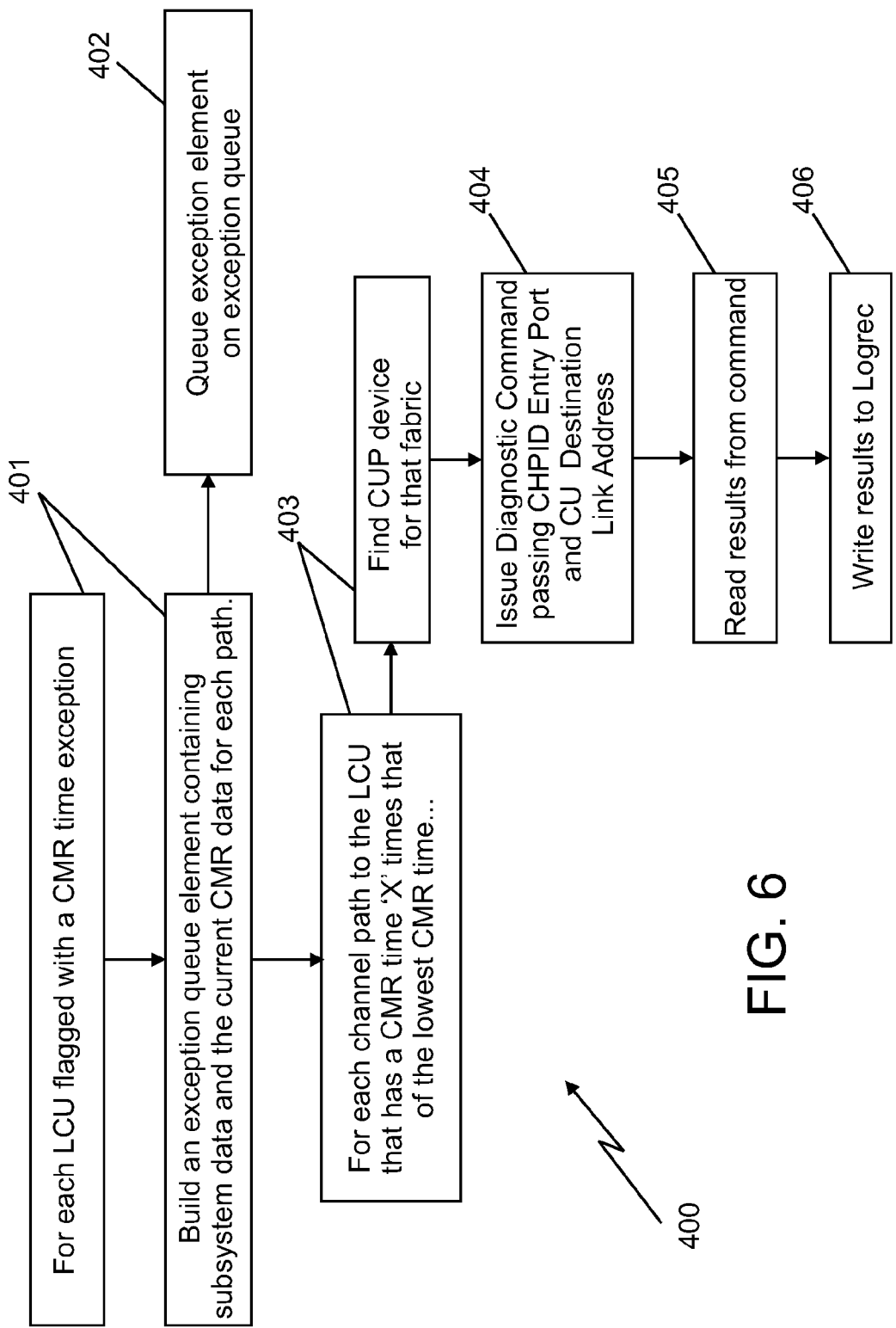
FIG. 6 is a flow diagram depicting an exemplary embodiment of a method of processing related to delays identified in FIGS. 5A and 5B.
Figure 7:
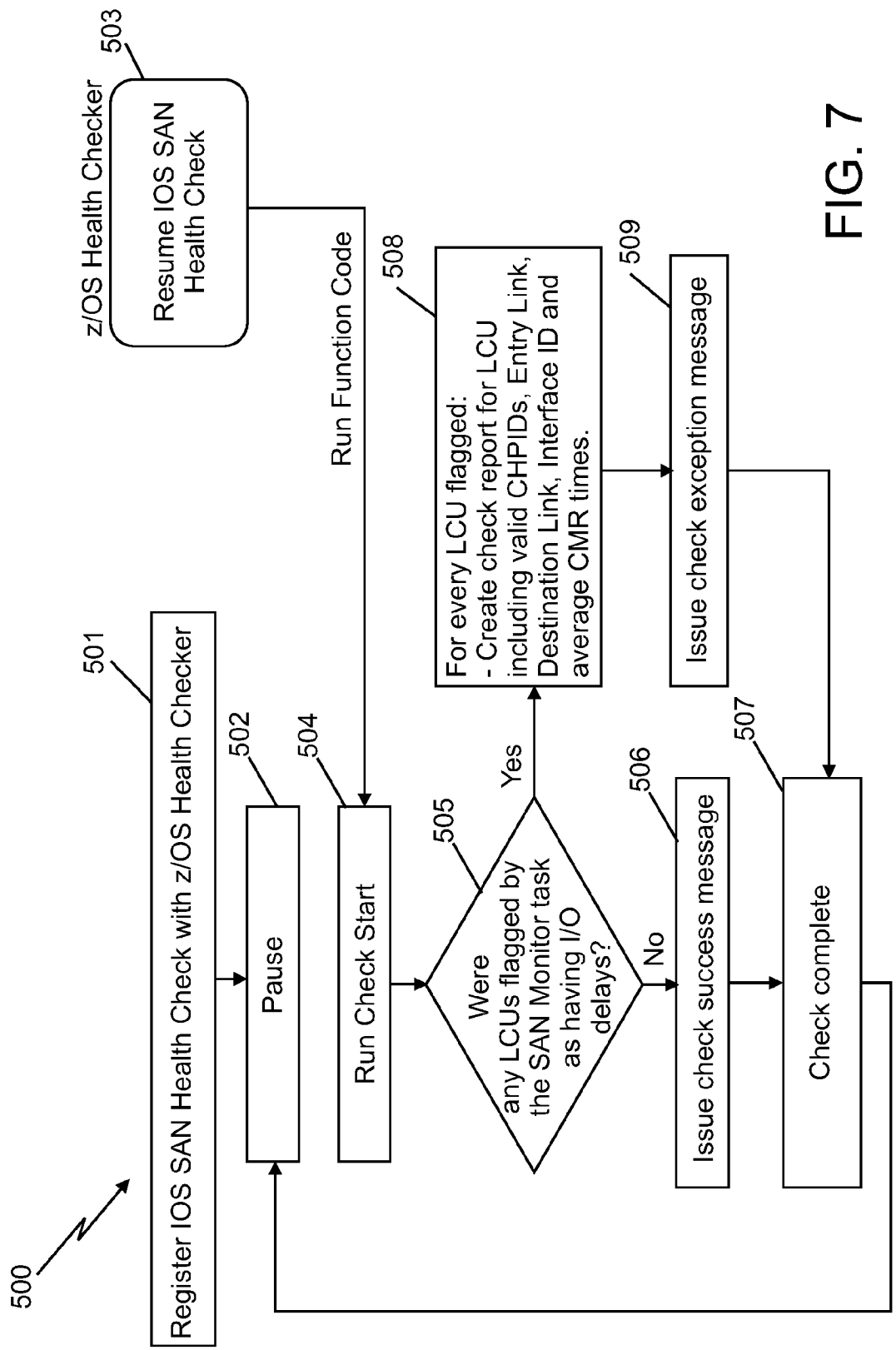
FIG. 7 is a flow diagram depicting an exemplary embodiment of a method of reporting delays.
Figure 8A:
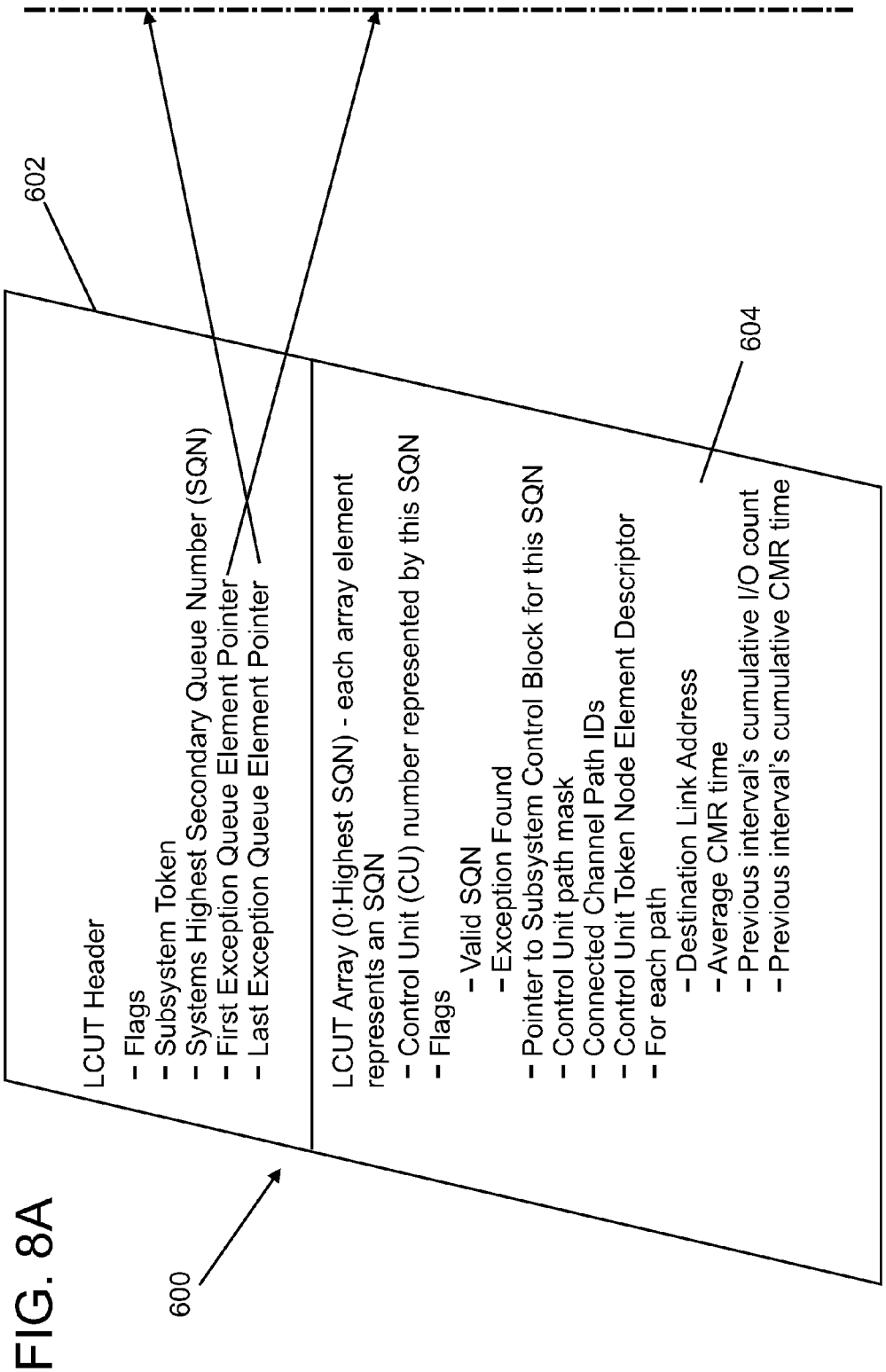
FIGS. 8A and 8B depicts an exemplary embodiment of a data structures configured to store measurement data generated by the computer system of FIGS. 1A and 1B.
Figures 8, 8B:
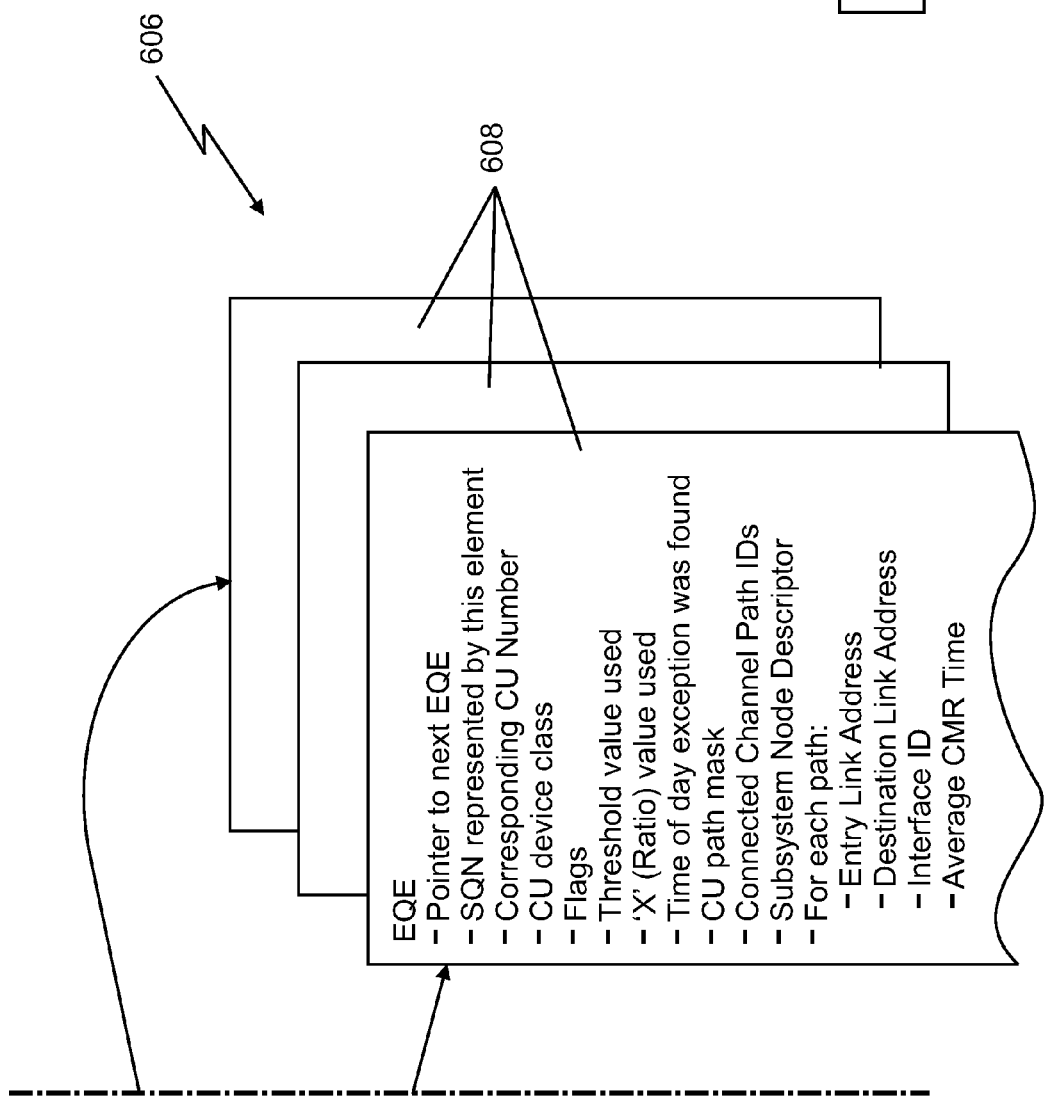

FIGS. 6-8 illustrate exemplary methods 300, 400 and 500 of monitoring devices, processors and control units connected to one or more host processors. The method 300 includes one or more stages 301-315, the method 400 includes one or more stages 401-406, and the method 500 includes one or more stages 501-509. The methods 300, 400 and 500 can be performed by one or more host processors 102, such as one or more host processors 102 or other processing or control entities in a cluster. In addition, the program instructions and configurations for monitoring I/O operations are not limited to the tasks described herein, but may be performed by any mechanism configured to measure times between sending responses over a communication path and receiving associated responses.

Figure 5A:
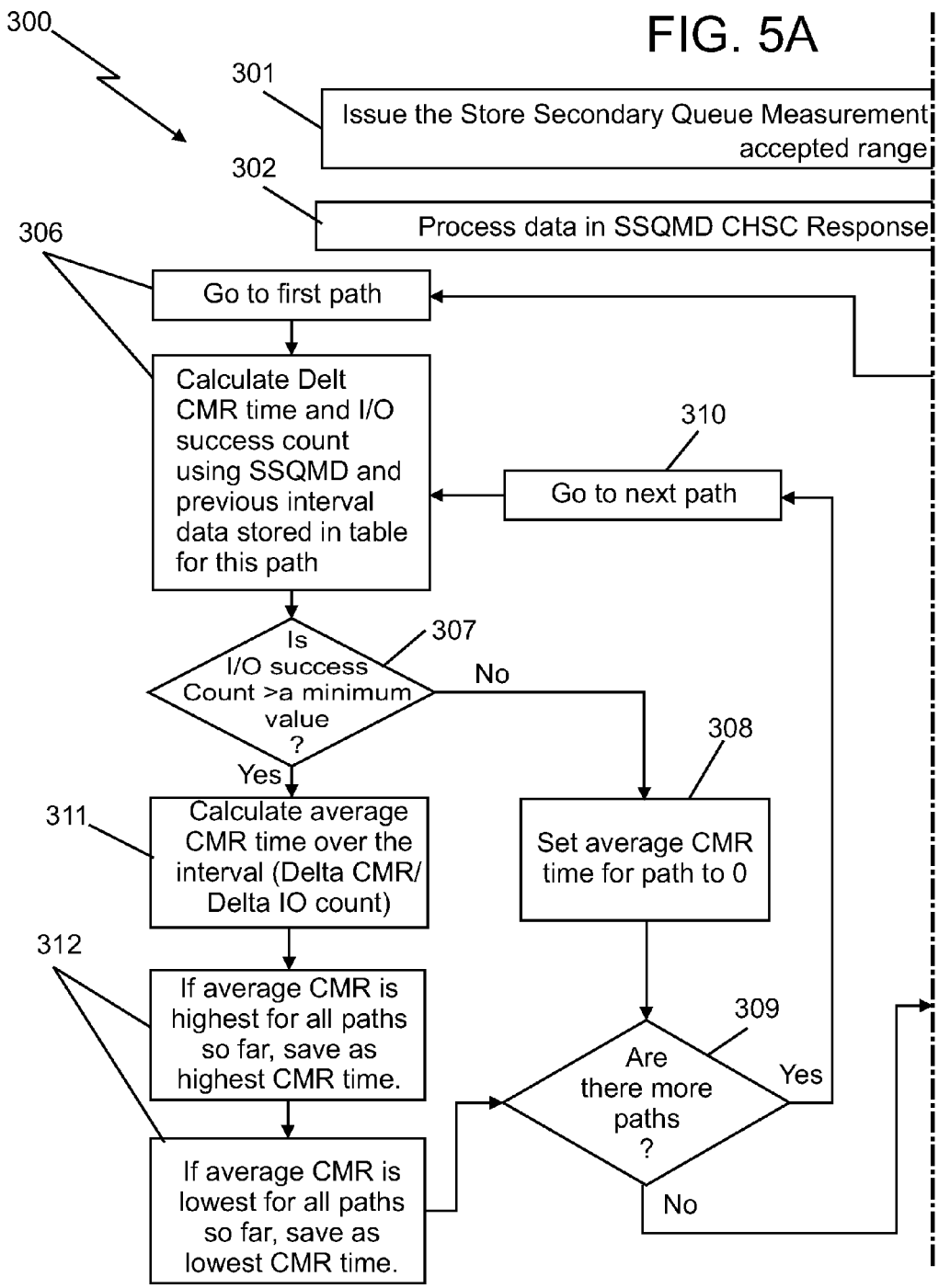

Referring to FIGS. 5A and 5B, in the first stage 301, the IOS supervisor component (or other host processor 102 component) is started up, and an IOS SAN Monitor Task 180 and an IOS SAN Health Check Task 182 is attached to the IOS address space 178. The OS 124 issues a CHSC instruction to the channel subsystem 112, which retrieves the CMR times, e.g., the secondary measurement queue data from the SMQB 150. In one embodiment, the I/O instruction is a Channel Subsystem Call (CHSC) instruction that is issued, for example, for each control unit 115. One example of a CHSC instruction is a Store Secondary Queue Measurement Data (SSQMD) CHSC instruction. In response to the CHSC instruction, the channel subsystem 112 stores the secondary measurement queue data. In one example, the CHSC instruction is a SSQMD CHSC for up to a maximum accepted range of secondary queues. Each SSQMD CHSC command may include a secondary queue number (SQN) identifying the logical control unit 115 that the command is being sent to.

In the second stage 302, the channel subsystem 112 receives a CHSC response message for each respective control unit represented by a subchannel 128, such as a SSQMD CHSC Response Block, and for each returned SQN, and the IOS supervisor extracts measurement data from the channel subsystem 112 and the Response Block over a selected time interval. Examples of measurement data include start pending times and initial command response times (CMR time). The IOS supervisor of the OS 124 processes measurement data relative to each control unit 115, such as CMR time. In one embodiment, each CMR time, or CMR time value derived from multiple CMRs over the selected time interval (e.g., 5 minutes), is extracted from a secondary measurement queue block 150 in the OS 124. For example, the I/O success count may be extracted for the selected interval from, for example, the Success Counts fields 174 of the secondary measurement queue block 150. The measurement data may be input into a data table or other structure, referred to herein as Logical Control Unit Table (LCUT). The measurement data is not limited to those described in the embodiments herein, and may be any suitable time values (such as those in the secondary queue measurement block 150) that can be utilized to evaluate system performance. The average CMR time per path is calculated for the I/O that occurred in the measurement interval.

In the third stage 303, the Monitor Task 180 first determines whether the data in the LCUT that is associated with an SQN includes previous interval data, i.e., CMR time data for commands previously sent to the respective control unit 128 during the selected time interval.

In the fourth stage 304, if the LCUT does not include previous interval data for the SQN, the CMR times and I/O success count (i.e., number of successful I/O commands and responses) are saved in the LCUT and associated with the SQN and respective paths for the selected time interval. The Monitor Task 180, as shown in the fifth stage 305, then processes measurement data for the next SQN.

In the sixth stage 306, if the LCUT includes previous interval data, the CMR times and success count for a first path (e.g., associated with a first control unit 128) is selected, and the delta or total CMR time and delta I/O success count for the interval are calculated by subtracting the values from the previous interval stored in the LCUT and the current values extracted from the SSQMD CHSC response block for this path.

In the seventh stage 307, the I/O success count is compared to a minimum count (e.g., 100). If the success count over the selected interval on the first path is less than the minimum count, in stage 308, an average CMR time for the path is set to zero, and the Monitor Task in stage 309 moves on and checks whether there are more paths for the SQN. If there are more paths for the SQN, in stage 310, the Monitor Task selects the next path and processes the CMR time and success count data for the next path in the selected interval as shown in stage 306, 307, 308, 311 and 312. When there are no more paths to process the Monitor task moves on to stage 313.

In the eleventh stage 311, if the Monitor Task determines in stage 307 that the I/O success count is greater than the minimum count, an average CMR time for the selected interval on the first path is calculated based on the total CMR time in the selected interval (Delta CMR time) and the I/O success count (Delta I/O count) in that interval. The average CMR time may be calculated by dividing the Delta CMR time by the Delta I/O count.

In the twelfth stage 312, the average CMR time for this path is compared to average CMR times for other paths for the respective control unit in the selected interval and saved as the high CMR time if it is the highest average CMR time for all paths so far, or saved as the low CMR time if it is the lowest CMR time for all paths so far. The Monitor Task in stage 309 moves on and checks whether there are more paths for the SQN. If there are more paths for the SQN, in stage 310, the Monitor Task selects the next path and processes the CMR time and success count data for the next path in the selected interval as shown in stage 306, 307, 308, 311 and 312. When there are no more paths to process the Monitor task moves on to stage 313.

In the thirteenth stage 313, the highest average CMR time is compared to a threshold value (e.g. one millisecond). and is also compared to the lowest CMR time to determine whether the highest CMR time is a selected multiple 'X' (e.g., 10) of the lowest CMR time.

In the fourteenth stage 314, if the highest CMR time is not greater than a threshold value or is not at least a selected multiple 'X' of the lowest CMR time, the CMR times and I/O success counts extracted from the SSQMD CHSC response block for the SQN and the calculated average CMR times per path for the interval are saved in the LCUT (see stage 304). The Monitor Task then processes measurement data for the next SQN (see stage 305).

In the fifteenth stage 315, if the highest average CMR time is greater than a threshold value and is at least a selected multiple 'X' of the lowest CMR time), the logical control unit 115 associated with the SQN is flagged as having an exception. The CMR times and I/O success counts extracted from the SSQMD CHSC for the SQN and the calculated average CMR times per path for the interval, along with an exception flag, are saved in the LCUT (see stage 304). The Monitor Task then processes measurement data for the next SQN (see stage 305).

FIG. 6 illustrates a method 400 for processing data related to control units or other components that trigger an exception, as described for example in method 300. For example, the method 400 describes the processing of data relative to a control unit 115 that was flagged as having an exception in stage 315.

In the first stage 401, for each logical control unit 115 flagged with a CMR time exception, an exception queue data element is built that contains subsystem data and the current average CMR time data for each path to the logical control unit 115. Examples of subsystem data include channel path IDs (CHPIDs) and average CMR time for each path.

In the second stage 402, an exception queue or other data structure is built and exception queue data elements for each flagged logical control unit 115 are input into the exception queue.

In the third stage 403, in one embodiment in which the system 100 includes a fabric, for each logical control unit 115 having a channel path that triggered an exception, the OS 124 locates the control unit port for a switch (e.g., CUP 916 shown for example in FIG. 10) that corresponds to the control unit 115 over the channel path with the high CMR time.

In the fourth stage 404, a diagnostic command is issued via the channel subsystem 112 to the CUP 916 on the channel 126. The diagnostic command includes information such as a CHPID entry port 192 and a control unit destination link 194 for the logical control unit 115. In one embodiment in which the system 100 includes a fabric, the channel subsystem 112 sends the diagnostic command to the switch 110, which may then trigger a state save so that exceptions in the channel path 126 can be evaluated directly from the switch 110.

In the fifth stage 405, the CUP 916 in FIG. 11 sends a response to the diagnostic command, and the response results are read by the OS 124. The response may include various amounts of diagnostic information to help identify the problem that caused the exception, such as diagnostic information shown in FIGS. 12A and 12B. The fabric management function may also perform a state save for use in servicing the equipment.

In the sixth stage 406, the OS 124 writes the results of the diagnostic command to a log record (e.g., LOGREC) data set configured to receive and save data relating to system performance. In one embodiment, the fabric switch 110, in response to the diagnostic command, also sends data to the LOGREC that indicates possible reasons for the exception. Such data may include indications of switch link failures, congestion conditions, lack of buffer credit issues, and other data relating to the link on the excepted path between the channel subsystem 112 and the I/O device 114.

FIG. 7 illustrates a method 500 for reporting an exception. In the first stage 501, the OS 124 registers the Health Check Task 182 with a Health Checking program (e.g., z/OS Health Checker). As shown in stage 502, the Health Check Task 182 is in a pause state until prompted by a function code to run a check on the system.

In the third stage 503, the Health Check program issues a run function code to start or resume the system check. In stage 504, in response to the run function code, the Health Check Task 182 starts the system check. The check may be started at selected time periods so that the system 100 is checked periodically.

In the fifth stage 505, the Health Check Task 182 determines if any logical control units 115 have been flagged with an exception by the Monitor Task 180. In one embodiment, the Health Check Task 180 checks the exception queue to determine whether any logical control units 115 have an exception. If no exceptions are found, in stage 506, the Health Check Task 180 issues a check success message to the user, and a check complete indication is issued back to the Health Check program at stage 507 to indicate the check has run.

In the eighth stage 508, if exceptions are found, a check report is generated for each affected logical control unit 115. The check report includes the various subsystem information saved in the corresponding exception queue element such as CHPIDs for paths associated with the logical control unit, entry link, destination link, interface ID and average CMR times for each path.

In the ninth stage 509, a check exception message is issued to the user including the entire check report. In one embodiment, a single check report and message is issued that includes data for each excepted logical control unit 115.

FIGS. 8A and 8B illustrate an example of a LCUT 600 and an exception queue 606 described in the above methods. The LCUT 600 may include an LCUT header 602 and an LCUT array 604. The LCUT header 602 includes, for example, flags, a subsystem token identifying the channel subsystem 112, an indicator of the system's highest SQN, and pointers to the exception queue 606. For example, the LCUT header includes a pointer that points to an address of a first exception queue element 608 in the exception queue 606, and a pointer that points to an address of a last exception queue element 608 in the exception queue 606.

The LCUT array 604 includes array elements from zero to the highest SQN, and each array element represents a SQN. Each array element includes fields such as a control unit (CU) number represented by an SQN, Flags (e.g., Valid SQN flag or Exception Found flag), a pointer to a subsystem control block for the SQN, a control unit path mask, CHPIDs for paths 126 connected to the control unit 115 associated with the SQN, and a control unit token node element descriptor. Each array element may also include information for each path and subchannel 128, such as a destination link address, an average CMR time, the previous interval's cumulative success count and the previous interval's cumulative CMR time.

FIG. 9 illustrates an exemplary method 700 of processing a diagnostic command as described in stages 404 and 405 of the method 400. The method 700 is described in conjunction with a point-to-point system or an embodiment of the system 100 including one or more switches 110. In one embodiment, shown in FIG. 10, the system includes a plurality of devices connected to the host processor, such as a control unit, communication paths and one or more switches or other network devices. The network devices such as switches 110 that may be configured as network directors 184, 186, 188 and 190, which are connected to a host processor 102 and a control unit 115 via a source entry port 192 and a destination exit port 194.

Referring again to FIG. 9, in the first stage 701, an exception condition is recognized for a control unit 115 and a channel path 126 to the control unit 115 (identified by a CHPID).

In the second stage 702, if the system 100 is a network, the Monitor Task 180 identifies one or more switches 110 and/or directors 184, 186, 188 and 190 within the network for diagnostic information retrieval. A director can be attached to a CHPID or a control unit 115, or any other director that is part of the network configuration.

In the third stage 703, the Monitor Task 180 issues a Set Diagnostic Parameters (SDP) command to a control device (e.g., a CUP 916) at the identified control unit 115 or I/O device 104 to specify a source to destination path through the network 100. If the system 100 is a network including one or more switches such as directors 184, 186, 188 and 190, the SDP command is sent through each director sent to the CUP 916. The SDP command specifies information including a source address (i.e., a port address in the channel subsystem 112 corresponding with the CHPID) and a destination address (i.e., a port address of the control unit 115). The SDP command may also specify a host system identifier, token and timestamp, and a director log request if the system 100 includes one or more directors that specifies whether director-specific log information is to be saved.

The Read Diagnostic Information (RDI) command may be chained to the SDP command. The SDP writes the parameters to the device 114 so they can be used for the execution of the RDI command. The Read Diagnostic Information (RDI) command to the CUP 916 is used to retrieve diagnostic information for the route specified by the source/destination addresses port addresses. For example, the RDI command includes information such as an identifier of each director 184, 186, 188 and 190 in the potential paths 126 between the source host processor 102 and the destination control unit 115, a host system identifier, token and timestamp, and a director log request if the system 100 includes one or more directors that specifies whether director-specific log information is to be saved. For each director, a Director Diagnostic Block (DDB) (shown for example in FIGS. 12A and 12B) may be provided identifying information such as entry and exit ports to the director, routing algorithms used between entry and exit ports within the director, and usage statistics for each exit port. The RDI command may also indicate to the switch fabric that a state save should be performed so that the support personnel can use the data captured at that point in time to diagnose the problem.

In the fifth stage 705, the Monitor Task 180 issues a Set Diagnostic Parameters (SDP) command to the control device (e.g., a CUP 916) at the identified control unit 115 or I/O device 114 to specify a source to destination path through the network 100. In this stage, the source address is a port address of the control unit 115 and the destination address is a port address of the CHPID.

In the sixth stage 706, the Monitor Task 180 issues a RDI command to the control device to retrieve diagnostic information for the route specified by the SDP command in stage 705.

FIG. 11 shows an example of the network 100 including the channel subsystem 112 and a plurality of network devices such as an entry director (i.e., "Director 0") 196 and an exit director 198, each of which include one or more entry ports at which frames or data enter the director and one or more exit ports at which frames or data exit the director. FIGS. 12A and 12B illustrate an example of a DDB for the entry director 196 and a DDB for the exit director 198 in the direction in which the host processor 102 is a source and the control unit 115.

In this example, each DDB includes entry and exit port addresses (2-9, A or B) in the respective director and diagnostic information such as usage statistics for each port. Usage statistics may include utilization percentage (Util. %) of use over a time interval for all traffic, a percentage of delay (Delay %) due to lack of buffer credit over a time interval for all traffic, and an error rate (Error Cnt) indicating a number of frame errors during a time interval for all traffic. Each DDB may also include an attached port address (the control unit (CH) or a port 2-9, A or B), a link type (a single physical link (S) or an aggregate link (A)) and/or a routing protocol. The routing protocol may be static routing (S) in which entry port traffic is always routed to the same exit port, or dynamic routing (D) in which entry port traffic is dynamically routed to one of a defined group of exit ports defined by a Dynamic Group Number (DGN).

The systems and methods described herein provide numerous advantages over prior art monitoring systems. Technical effects and benefits include the ability to automatically and quickly identify problems in channel paths and/or control units, which may be cause average service times to increase but are not obvious to systems programmers because they are less than the architected time-out values. Other advantages include a diagnostic command that returns information in response to delays to help identify causes of I/O delays.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for processing communications between a host processor and at least one device connected to the host processor by an input/output processing system, comprising a non-transitory, tangible storage medium readable by a processing circuit and storing instructions for execution by the processing circuit for performing a method comprising:
   receiving transmission data over a selected time interval for each of a plurality of communication paths between the host processor and a control unit configured to control at least one I/O device;
   calculating an average round-trip transmission time for each of the plurality of communication paths over the time interval, wherein calculating includes identifying a first communication path having a highest average round-trip transmission time and identifying a second communication path having a lowest average round-trip transmission time;
   comparing the average round-trip transmission time for the first communication path having the highest average round-trip transmission time to a threshold value; and
   determining, based on the highest average round-trip transmission time exceeding the threshold value, whether the transmission data indicates a delay in communication between the host processor and the control unit requiring at least one of a monitoring action and a recovery action, wherein determining includes:
   calculating a ratio of the highest average round-trip transmission time to the lowest average round-trip transmission time; and
   based on the ratio exceeding a selected value, determining that the transmission data indicates a delay.

2. The computer program product of claim 1, wherein the I/O processing system is a channel subsystem, the plurality of communication paths are channel paths, and the channel subsystem and the control unit support a Fibre Channel (FC) protocol.

3. The computer program product of claim 2, wherein receiving the transmission data includes issuing a channel subsystem call (CHSC) to retrieve the transmission data from a control block in the I/O processing system.

4. The computer program product of claim 1, wherein the average round-trip transmission time includes a plurality of initial command response (CMR) times for each communication path, and the control block is a secondary queue measurement block (SQMB) associated with each control unit, the SQMB including a success counts field indicating a number of successful initial commands sent on a communication path and an initial command response field indicating a CMR time for each initial command sent on the communication path.

5. The computer program product of claim 1, wherein the average round-trip transmission time is an average of a plurality of round-trip transmission times corresponding to a plurality of successful I/O operations performed on a respective communication path over the selected time interval.

6. The computer program product of claim 4, wherein the host processor includes an operating system that is configured to generate a control unit table that is configured to store the plurality of CMR times.

7. The computer program product of claim 6, wherein calculating the average round-trip transmission time includes:
   receiving the plurality of CMR times and a success count from the SQMB for each communication path over the selected time interval;
   responsive to the SQMB not having previous CMR times and previous success counts associated with at least one previous time interval, storing the plurality of CMR times and the success count in the control unit table; and
   responsive to the control unit table having previous CMR times and previous success counts, generating a delta CMR time and a delta success count by subtracting the previous CMR times and the previous success counts from the plurality of CMR times and success counts respectively, and calculating an average CMR time by dividing the delta CMR time by the delta success count, determining and comparing the average CMR times.

8. The computer program product of claim 7, wherein comparing the average round trip-transmission time includes:

calculating the average CMR time over the selected time interval for the first communication path and calculating additional average CMR times for each of one or more additional communication paths to the control unit, and determining a highest average CMR time and a lowest average CMR time for the plurality of communication paths; and indicating that the control unit has a delay in response to the highest average CMR time for a path being greater than the threshold value and a ratio of the highest average CMR time to the lowest average CMR time exceeding the customer specified value.

9. The computer program product of claim 1, wherein the method further includes generating an exception indication in response to the highest average round-trip transmission time exceeding the threshold value and the ratio exceeding the customer specified value.

10. The computer program product of claim 9, wherein generating the exception indication includes building an exception queue element for each control unit, the exception queue element including a flag indicating whether the control unit is associated with an exception condition and the average round-trip transmission time for each communication path connected to the control unit.

11. The computer program product of claim 10, wherein the method further includes issuing a diagnostic command for each communication path to each control unit associated with an exception indication, the diagnostic command including an identification of the communication path and the control unit associated with the exception indication and requesting diagnostic information from one or more components connected to the communication path.

12. The computer program product of claim 11, wherein the diagnostic command includes a Set Diagnostic Parameters (SDP) command configured to identify the one or more components and identify the diagnostic information, and a Read Diagnostic Information command configured to direct the one or more components to return the diagnostic information identified in the SDP command.

13. The computer program product of claim 11, wherein the diagnostic command is configured to prompt the one or more components to save respective diagnostic information therein.

* * * * *